United States Patent [19]
Di Gregorio et al.

[11] 3,814,396
[45] June 4, 1974

[54] AERATION APPARATUS

[75] Inventors: David Di Gregorio, Salt Lake City; Gerald Lynwood Shell, Sandy, both of Utah

[73] Assignee: Envirotech Corporation, Salt Lake City, Utah

[22] Filed: Feb. 16, 1972

[21] Appl. No.: 226,855

[52] U.S. Cl. ................................... 261/93, 261/87
[51] Int. Cl. ............................................. B01f 3/04
[58] Field of Search .............................. 261/87, 93

[56] References Cited
UNITED STATES PATENTS

| | | | |
|---|---|---|---|
| 1,526,596 | 2/1925 | Greenawalt | 261/93 |
| 2,448,590 | 9/1948 | Gunther | 261/93 |
| 2,767,964 | 10/1956 | Potts | 261/93 |
| 2,928,661 | 3/1960 | MacLaren | 261/93 |
| 3,387,832 | 6/1968 | Nelson | 261/93 |
| 3,439,904 | 4/1969 | Oldshue et al. | 261/93 |

FOREIGN PATENTS OR APPLICATIONS

| | | | |
|---|---|---|---|
| 1,580,389 | 7/1969 | France | 261/87 |
| 68,129 | 7/1944 | Norway | 261/93 |

*Primary Examiner*—Tim R. Miles
*Attorney, Agent, or Firm*—Robert R. Finch

[57] ABSTRACT

A submerged aerator includes a non-impelling bubble shearing mechanism rotating with and below an axial flow impeller which impells liquid downward past the bubble shearing mechanism to entrain the sheared bubbles in the downward flow to provide increased retention of the sheared bubbles in the lower portion of the liquid body. The shearing mechanism includes a hollow cylinder having an open bottom to receive bubbles, a closed top concentrically secured to a rotating shaft, and a slotted sidewall through which the bubbles are released and sheared.

4 Claims, 3 Drawing Figures

AERATION APPARATUS

BACKGROUND OF THE INVENTION

State of the Art

This invention generally relates to method and apparatus to mechanically transfer oxygen into a body of liquid; in particular, the invention relates to an improved submerged aeration device. The apparatus of the invention may be used, for example, to aerate water in a basin of a wastewater treatment plant.

Aeration is a step common to various processes wherein oxygen is transferred to wastewater or other liquids to provide for their biological purification. Equipment commonly employed for accomplishing the aeration of wastewater consists of three basic types: (a) air diffusion units comprising, for example, a porous media (such as a sintered pipe) through which air escapes into the body of polluted liquid; (b) surface aeration units in which oxygen transfer is accomplished by high surface turbulence and liquid spray; and (c) submerged aeration systems in which air is released below the rotating blades of a substantially submerged impeller. The present invention is particularly directed to submerged aeration equipment.

Conventionally, a submerged impeller pumps liquid both radially and upwardly and a sparger or similar device is located below the turbine impeller to release a uniformly distributed stream of air from a remote pressurizing source into the liquid body. The impeller is submerged sufficiently to draw liquid even from the bottom of the liquid-holding container. The rising bubbles are sheared by the moving impeller blades and are concomitantly mixed into the rising liquid. The resulting mixture of air bubbles and liquid ascends to the liquid surface during which time oxygenation occurs; at the surface, the bubbles burst and the contained air escapes to the atmosphere. Upward flow of the mixture is due both to the motivation of the impeller and the lift from the bubbles. Prior impellers thus function both to shear the air bubbles passing up through the whirling impeller blades as well as to mix the air bubbles with the liquid.

It is known that the rate of oxygenation or oxygen transfer into a liquid is directly proportional to the surface area of air bubbles mixed thereinto (i.e., to the interfacial area of transfer). In other words, a larger percentage of any given quantity of air is dissolved in the liquid if the size of the air bubbles mixed thereinto is reduced. Prior design attempted to optimize, in one impeller, both the liquid pumping and bubble shearing functions.

Prior, upwardly-pumping impellers pump a very heterogeneous mixture of air bubbles and liquid. That is, bubble size is non-uniform and bubbles are not evenly distributed. The non-uniformity of the mixture may cause destructive imbalance and vibration in the impeller and its drive system.

SUMMARY OF THE INVENTION

The invention provides an aeration apparatus to operate submerged in liquid above an air inlet. The apparatus comprises a non-impelling bubble shearing mechanism secured to and rotatable with the submerged end of a vertical shaft. An axial flow impeller is fixed to the shaft above the shearing mechanism to also rotate therewith. According to the invention, the impeller drives liquid downward past the shearing mechanism to intersect and entrain the sheared bubbles emitted therefrom, thereby to provide (a) increased retention of the mixture in the lower portion of the liquid, and (b) additional contact between sheared bubbles and recirculating liquid before the bubbles rise to the liquid surface body. In one embodiment, the shearing mechanism includes a hollow cylinder having an open bottom to receive bubbles from the compressed air emitting means, a closed top concentrically secured to the shaft, and a slotted sidewall through which the bubbles are released and sheared.

OBJECTS OF THE INVENTION

A primary object is to provide a submerged aerator having increased oxygenation efficiency;

Another object is to provide aeration system having reduced power requirements while providing efficient oxygenation of liquid;

Yet another object is to provide an aerator apparatus of the submerged type which is hydrodynamically stable;

Still another object is to provide aeration apparatus which effects increased detention time for air;

A further object is to provide a submerged aeration device effectively operable at less depth than conventional aerators of the submerged type while still providing adequate mixing.

BRIEF DESCRIPTION OF THE DRAWINGS

The above and other objects and advantages may be readily understood by referring to the following description and appended drawings which are offered by way of illustration and not in limitation of the invention, the scope of which is defined by the appended claims and equivalents. In the drawings:

DETAILED DESCRIPTION OF THE PREFERRED EMBODIMENT

Figure 1:
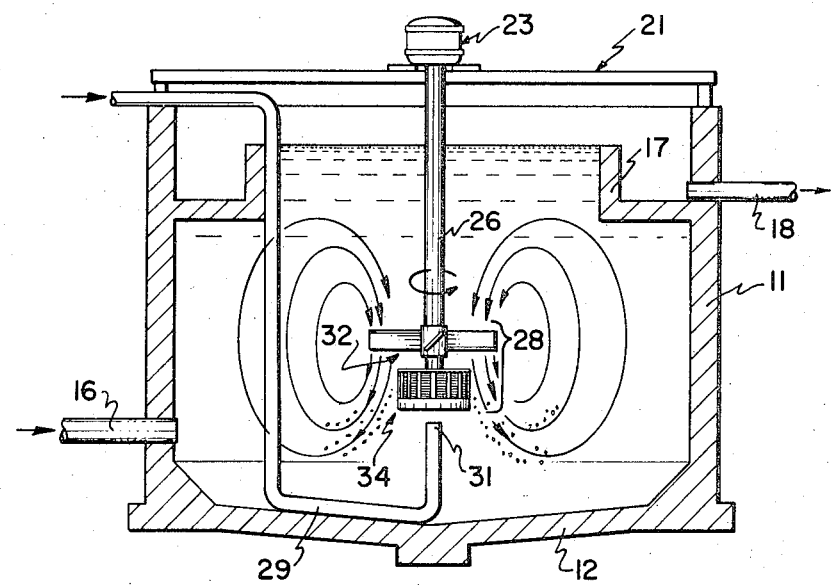
FIG. 1 is a side sectional view of a tank containing aeration apparatus embodying the invention, certain parts being shown in elevation.

The environment of the invention, FIG. 1, includes a typical circular tank or basin which has a generally upstanding sidewall 11, a substantially flat bottom 12 and is filled to some chosen level with liquid to be aerated. The tank is provided with a pipe 16 for introducing influent and a weir 17 over which effluent flows into a peripheral launder for discharge via a pipe 18. A support structure, generally designated 21, traverses the tank and is, for example, a truss or beam-type arrangement.

A drive means 23 is mounted on the support structure generally centrally of the tank and comprises an appropriately geared motor and a suitable coupling means (not shown in detail). The motor, through the coupling means, rotates a depending shaft 26 about its longitudinal axis. An impeller and shearing mechanism (generally designated 28 in FIG. 1) according to the invention is secured to the lower submerged end of the shaft 26 to rotate therewith. A pipe 29 carries pressurized air from a source such as a conventional blower (not shown) outside the tank to emit at the pipe end 31 in the liquid beneath the shearing mechanism 28. Alternatively, pressurized air may be carried through a suitable conduit coaxially within the shaft 26 to emit from the lower end of the shaft.

Figure 2:
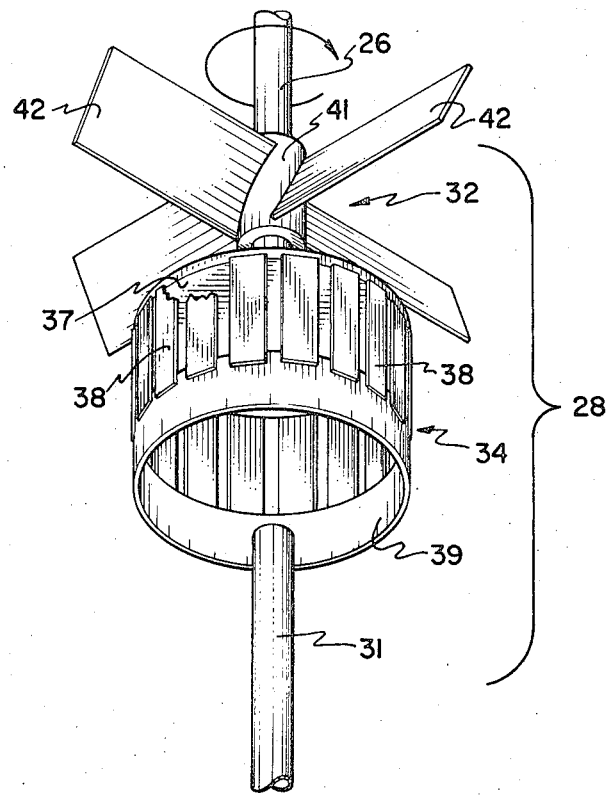
FIG. 2 is an enlarged perspective view of the aeration apparatus shown in FIG. 1, a portion being cut away for clarity.

According to the invention, the mechanism 28 comprises a pumping impeller 32 fixed to a lower portion of the shaft 26 and arranged to pump liquid axially of the shaft. The mechanism 28 further includes a shearing cylinder 34 fixed to the shaft 26 below the impeller to be concentric therewith. The shearing cylinder (as best shown in FIG. 2) is hollow and has an open bottom and a closed top 37, the latter being fixed to the shaft 26. The sidewall of the cylinder is composed of vertically arranged, equally spaced-apart thin shearing plates 38 which provide a slotted sidewall spaced concentrically about the shaft for rotation therewith. In the embodiment of FIG. 2, the shearing plates are straight and are fixed at an angle tangent to the direction of the rotation of the cylinder.

A ring 39 is fixed to the lower end of the shearing blades 38 to give the cylinder structural strength and, more importantly, to hydrodynamically stabilize the entire submerged aerator assembly to eliminate gyratory action during high speed rotation thus minimizing destructive forces on the mechanism 28 and the drive.

The impeller 32 in FIG. 2 is located on the shaft above the shearing cylinder and comprises a hub 41 fitted to the shaft 26 and a plurality of radially extending impeller blades 42. The blades are arranged to maximize axially downward pumping of liquid toward the tank bottom. In practice, the blades are canted at 45° from horizontal. Propeller-like blades may also be utilized; such blades are radially directed and twisted to an appropriate pitch.

Figure 3:
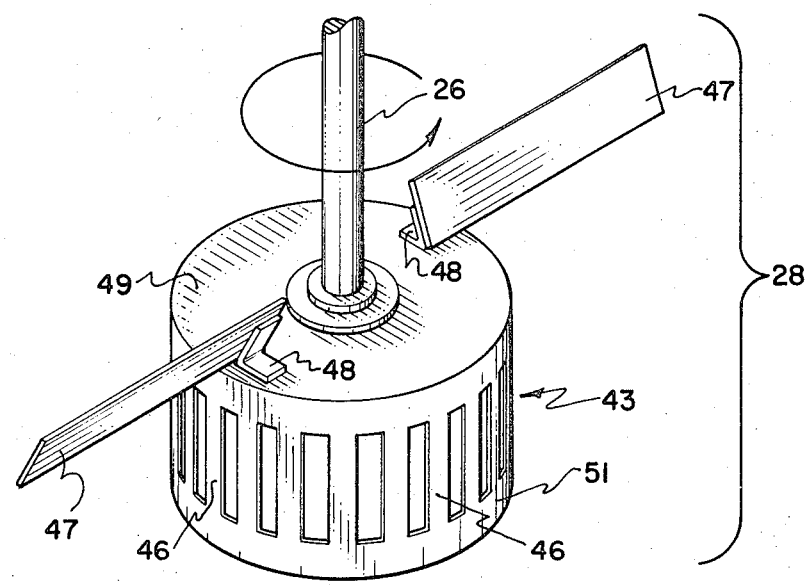
FIG. 3 is a perspective view of another embodiment of the apparatus shown generally in FIG. 2.

The mechanism 28 as modified in FIG. 3 includes a shearing cylinder designated 43 substantially the same as the previously-described shearing cylinder 34. In this embodiment, the sidewall of the shearing cylinder 43 is simply slotted vertically whereby the shearing plates 46 consist of curved sections of the sidewall. Hereinafter, the cylinder sidewall is referred to as "slotted" to denote both the construction of FIGS. 2 and 3. Impeller blades 47 are fixed (as by brackets 48) to the top closure 49 of the cylinder which is, as before, rigidly fixed to the rotating shaft 26. Only two impeller blades are shown but more may be utilized. The impeller blades 47 begin generally at the periphery of the shearing cylinder and extend radially outward therefrom. Since there is little blade area directly above the top 49 of the shearing cylinder, pumping down onto the top of the cylinder is substantially eliminated. Otherwise, the impeller blades 47 are similar to the blades 42 in FIG. 2. The shearing cylinder 43 further includes an integral stabilizing ring 51 serving the same stabilizing function as the ring 39 in FIG. 2.

According to the invention, air bubbles emitted from the end 31 of air pipe rise into the hollow shearing cylinder where the bubbles are momentarily contained, thence flow radially outward through the cylinder's sidewall slots where the edges of the whirling plates (38 or 46) shear or comminute the bubbles and release the same in a diverging, radially uniform flow. The shearing plates neither substantially pump nor impell air from the shearing impellers. Roughly speaking, most of the sheared bubbles are about one-quarter to one-eighth inch in diameter. The sheared bubbles are uniformly distributed about the outer periphery of the rotating cylinder where, before they can rise into the impeller blades, they are intersected and entrained by and mixed with liquid flowing downwardly from the impeller. The resulting homogeneous mixture of liquid and sheared gas bubbles flows down toward and across the tank floor 12 then upward near the tank sidewall 11 and back down to the impeller as indicated by the arrows in FIG. 1. The flow pattern results in a longer detention time for the bubbles in the liquid and, concomitantly, an improved oxygen transfer rate. In contrast to conventional submerged turbine arrangements, the bubbles are pumped downward at least once before they rise to the surface of the liquid. In other words, a substantial percentage of the air bubbles rising along the tank wall are drawn back down into the axial pumping impeller suction and are recirculated before actual discharge from the liquid.

The apparatus and method of the invention results in an oxygen transfer into the liquid of about 30 to 40 percent of the oxygen introduced into the liquid, while prior submerged aeration apparatus transfers only about 15 to 20 percent of the oxygen introduced. In other words, the apparatus and method of the invention require the introduction of substantially less air than do prior submerged aerators to obtain the same oxygen transfer rate. Stated in still other words, comparable oxygen transfer is achieved at lower air discharge pressures and volume, thus with less power consumption by the air compressing and discharging means. Although the impeller and shearing assembly may consume about the same horsepower as prior submerged aerators, the savings in air handling equipment is so drastic that the overall power consumption is greatly reduced. The apparatus and method of the present invention has an oxygen transfer rate of 2.5 to 3.0 pounds of oxygen per horsepower-hour while prior commercially available submerged aerators provide oxygen transfer rates of about 1.5 to 1.7 pounds of oxygen transferred per horsepower-hour. Another advantage of the present system is that the impeller situated according to the invention operates in a homogeneous liquid of uniform density rather than in a heterogeneous mixture of air and liquid which might cause destructive imbalance in the impeller and its drive system. The downward flow from the impeller further insures adequate mixing at the tank bottom.

We claim:

1. Apparatus for mixing gas with liquid contained in a tank, said apparatus comprising an inlet for emitting gas in submergence in liquid in the tank, a shaft journalled for rotation about its longitudinal axis and adapted to be mounted to extend vertically into said tank, a gas shearing and distributing means secured to the lower end of said shaft for rotation therewith in submergence in said tank, said means comprising a cylindrical member closed at one end and open at the other with the open end facing downwardly and the closed end located above said gas inlet, vertical slots in the sidewall of said cylindrical member, a pumping impeller secured to said shaft above the slots of said cylindrical member and extending radially beyond the walls of said cylindrical member so that upon rotation thereof liquid is pumped downwardly past said slots, and drive means for effecting rotation of said shaft, said cylindrical member and said impeller whereby gas emitted from said inlet flows into said cylindrical member thence radially outwardly thereof through said slots to be sheared by the edges thereof and be entrained in the downwardly flowing liquid.

2. Apparatus according to claim 1 in which said slots in the sidewall of said shearing means terminate short of said open end thereby to form at said open end a solid ring.

3. Apparatus according to claim 1 in which said impeller is secured to said shearing means to extend outwardly therefrom adjacent its closed end above said slots.

4. Apparatus according to claim 1 in which the open end of the shearing means is positioned above the gas inlet.

* * * * *